United States Patent [19]

Hénault

[11] 4,315,142

[45] Feb. 9, 1982

[54] TEMPERATURE REGULATING DEVICE FOR ELECTRIC HEATING APPARATUS

[75] Inventor: Jean-Paul Hénault, Houdan, France

[73] Assignee: Airelec Industries, France

[21] Appl. No.: 147,239

[22] Filed: May 6, 1980

[30] Foreign Application Priority Data

May 8, 1979 [FR] France .................. 79 11612

[51] Int. Cl.³ .................................. H05B 1/02
[52] U.S. Cl. .............................. 219/511; 219/505; 219/504; 219/494
[58] Field of Search ............ 219/212, 511, 512, 494, 219/513, 504, 505, 509; 236/68 B, 68 C

[56] References Cited

U.S. PATENT DOCUMENTS

| | | | |
|---|---|---|---|
| 3,115,566 | 12/1963 | Jacobs | 219/511 |
| 3,627,987 | 12/1971 | Holtkamp | 219/511 |
| 3,679,518 | 7/1972 | Andler et al. | 219/492 |
| 3,817,453 | 6/1974 | Pinckaers | 219/511 |
| 3,846,679 | 11/1974 | Jost et al. | 219/511 |

FOREIGN PATENT DOCUMENTS 575945  3/1946  United Kingdom ............ 219/511

Primary Examiner—Gene Z. Rubinson
Assistant Examiner—Mark H. Paschall
Attorney, Agent, or Firm—Roylance, Abrams, Berdo & Farley

[57] ABSTRACT

A temperature regulating device for electric heating apparatus has a thermostat for controlling the operation of the apparatus, the thermostat being thermally coupled to a regulation resistor connected in series with a resistor, the resistance of which varies as a function of temperature.

The latter resistance is thermally coupled to a differential correction first heating resistance and to a shift correction second heating resistance, these two resistors having different time constants and being energized, respectively, when the heating apparatus is turned on by the thermostat and when it is turned off.

4 Claims, 1 Drawing Figure

U.S. Patent      Feb. 9, 1982      4,315,142
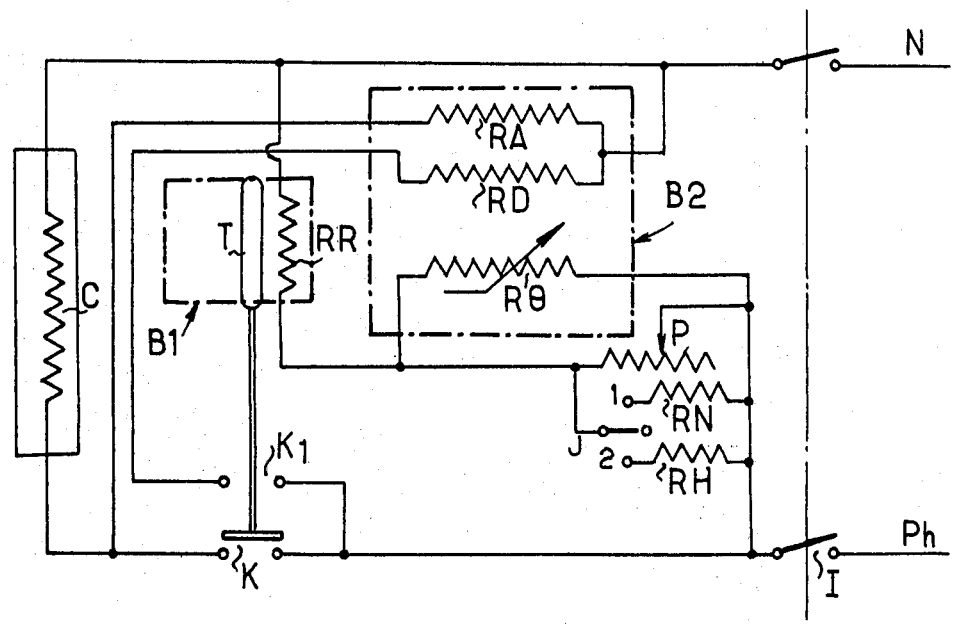

TEMPERATURE REGULATING DEVICE FOR ELECTRIC HEATING APPARATUS

The present invention relates to a temperature-regulating device for electric heating apparatus, of the type comprising a thermostat for controlling the operation of said heating apparatus, said thermostat being thermally coupled to a regulation resistor connected in series with a resistor that varies as a function of temperature.

In the electric heating apparatus of the prior art, the thermostat is usually installed inside the apparatus, so that it is subjected to the very temperature rise of said apparatus, e.g. a convector. Moreover, the distribution of temperature within the premises to be warmed depends upon the power requirements for heating. For all the above reasons, it is necessary to induce a correction at the level of the thermostat temperature-sensitive element, said thermostat being most often of the electromechanic type, in order to obtain a constant temperature on the premises, whatever the required heating power may be.

To this end, there exist at present systems, the function of which is to exert an influence on the thermostat sensitive element, by means of two or three heating resistors, at least one of which is under the dependence of a variable resistor of the thermistor-type, the value of which is a function of the heating apparatus temperature. Such systems have the draw-back of being fairly difficult to regulate and to maintain the temperature setting at the thermostat level.

The main object of the present invention is accordingly to obviate the above-mentioned draw-backs. More specifically, the object of the present invention is to provide a temperature-regulating device of the above-mentioned type, essentially characterized in that the resistor that varies as a function of temperature is thermally coupled to a first differential correction heating resistor and to a second shift correction heating resistor, these two resistors having different time constants and being energized at the moment the operation of said heating apparatus is initiated by the thermostat, and when said thermostat is put off, respectively.

Preferably, the time constant of the differential correction resistor is substantially zero with respect to that of the variable resistor, whereas the time constant of the shift correction resistor is of the same order as that of the heating apparatus temperature rise.

Preferably again, said variable resistor is associated to a temperature regulating potentiometer.

In view of such a general arrangement, all regulations and corrections are carried out outside the thermostat, the latter thus having but one reference point. In addition, the thermostat is corrected, as regards outside influences, by a single heating element, constituted by the regulation resistor.

While being very efficient, the regulation is therefore much more easily obtained.

Preferably, two manually switchable resistors are mounted across the regulation potentiometer, said two resistors being adapted to provide two different temperature levels.

One of said resistors will be assigned, e.g., to the decrease of temperature by night, the other being assigned to the protection of the whole installation against freezing.

Other features of the present invention will appear from the following description, giving, merely by way of example, one possible embodiment, with reference to the accompanying drawing, in which the sole FIGURE is an electric diagram of a regulation device according to the invention.

In that FIGURE is shown at C the heating element of an electric heating apparatus, for instance of the convector-type, fed by a source of electric power comprising a neutral wire N and a power line Ph, through a general switch I. The current feed proper of said heating element C is, in addition, under the dependence of contacts K of an environment thermostat T, e.g. of the bulb-type, with only one reference point.

The sensitive element of thermostat T is thermally coupled to a so-called regulation heating resistor RR as shown at $B_1$ in the FIGURE. Said regulation resistor RR is mounted in parallel with the current feed, through a potentiometer P connected in series with said resistor, permitting one to regulate the desired temperature manually. Across said potentiometer P is also mounted a resistor $R\theta$, of the thermistor-type, the value of which is a function of temperature.

According to the present invention, said variable resistor $R\theta$ is thermally coupled, as shown at $B_2$, to a first so-called differential correction heating resistor RA and to a second so-called shift-correction heating resistor RD. The time constant of resistor RA is substantially zero with respect to that of resistor $R\theta$, whereas the time constant of resistor RD with respect to said resistor $R\theta$ is of the same order as that of the convector temperature rise. Resistor RA is connected across heating element C and it is not energized until contacts K or thermostat T are closed, whereas resistor RD is not energized until thermostat T is put off through the rest contacts K1 thereof.

The above circuit is completed by means of two resistors RN and RH, mounted across potentiometer P, said resistors being manually switchable by means of a switching device J. These resistors permit one to obtain two different non-adjustable temperature levels, assigned to the decrease of temperature by night and to the protection of the whole installation against freezing, respectively.

The above-described temperature regulation device operates as follows:

At the moment the apparatus is put in operation, regulation resistor RR is fed with current and the temperature thereof is caused to rise, said resistor thus heating the sensitive element of thermostat T. In other words, the higher the temperature rise of said resistor RR, the lower the temperature of the premises to be warmed, and conversely.

Adjustable potentiometer P of course permits one to cause the temperature-rise of resistor RR to vary and, accordingly, permits one to induce a certain temperature rise in the sensitive element of thermostat T, so that it is possible and easy to adjust the desired temperature within a certain range.

At the moment contacts K of thermostat T are closed, differential correction resistor RA is energized and immediately induces a temperature-rise in variable resistor $R\theta$, which in turn, causes a decrease of the differential, viz of the difference between the triggering and release temperatures of the thermostat, thus making it possible to obtain more comfortable conditions on the premises.

When the thermostat is being put off, shift correction resistor RD is energized through rest contacts K1 and, since the temperature-rise time constant of said resistor with respect resistor $R\theta$ is of the same order as that of the convector heating on the thermostat, resistor RD permits to modify the effect of regulation resistor RR materially and, accordingly, to induce a certain correction of the shift that unavoidably occurs as the convector temperature rises, and of the temperature distribution on the premises, said distribution being variable according to external temperature.

As far as resistors RN and RH are concerned, they are normally put out of circuit and can be electrically connected across potentiometer P only by means of manual switch J. When either of these resistors is thus switched, potentiometer P is short-circuited, which induces an increase of current in regulation resistor RR and, accordingly, an extra temperature-rise in sensitive element of thermostat T, which causes the reference point thereof to decrease. Resistor RN can therefore assigned to a temperature decrease by a few degrees by night, with a view to saving power, whereas resistor RH can be assigned to the protection of the whole installation against freezing.

The regulation device according to the present invention can thus be considered as highly efficient, while being of very simple construction.

I claim:

1. A temperature regulating device for controlling the operation of an electric heating apparatus of the type having a power supply and a space heating element, the device including the combination of
   a thermostat;
   switch means actuated by said thermostat between a first position for connecting the power supply to the heating element and a second position;
   a regulating resistor and a temperature variable resistor connected in series circuit relationship, the series circuit thus formed being adapted to be electrically connected aross the power supply,
   said regulation resistor being thermally coupled to said thermostat;
   a differential correction heating resistor adapted to be electrically connected in parallel circuit relationship with the heating element; and
   a shift correction heating resistor electrically connected to said switch means for energization by the power supply when said switch means is in said second position,
   said shift correction heating resistor having a time constant which is different from the time constant of said differential correction heating resistor, and
   said differential correction heating resistor and said shift correction heating resistor being thermally coupled to said temperature variable resistor.

2. A device according to claim 1, wherein the time constant of said differential correction resistor is substantially zero with respect to that of said variable resistor, and wherein the time constant of said shift correction resistor is of the same order as that of the temperature rise of said heating apparatus.

3. A device according to either of claims 1 and 2, wherein said temperature variable is electrically connected to a temperature regulating potentiometer.

4. A device according to claim 3, wherein two manually-switchable resistors are electrically connected across said regulating potentiometer, said two resistors providing two different temperature levels.

* * * * *